United States Patent [19]

Thomas

[11] Patent Number: 4,631,972

[45] **Date of Patent: * Dec. 30, 1986**

[54] PROGRAMMER CONTROL DEVICE

[75] Inventor: Francis Thomas, Cluses, France

[73] Assignee: Carpano et Pons, Cluses, France

[ * ] Notice: The portion of the term of this patent subsequent to Jan. 14, 2003 has been disclaimed.

[21] Appl. No.: 628,488

[22] Filed: Jul. 6, 1984

[51] Int. Cl.[4] .......... F16H 27/04

[52] U.S. Cl. .......... 74/113; 74/125; 74/149; 74/568 T

[58] Field of Search .......... 74/116, 122, 125, 148, 74/149, 151, 153, 568 T, 113

[56] References Cited

U.S. PATENT DOCUMENTS

| | | | |
|---|---|---|---|
| 785,425 | 3/1905 | Leavitt | 74/122 |
| 1,208,704 | 12/1916 | Unger | 74/116 |
| 3,132,528 | 5/1964 | Elle et al. | 74/125 |
| 3,818,774 | 6/1974 | Schekenburger et al. | 74/125 |
| 4,228,690 | 10/1980 | Ring | 74/568 T |
| 4,430,903 | 2/1984 | Hooker et al. | 74/153 |

FOREIGN PATENT DOCUMENTS

| | | | |
|---|---|---|---|
| 928523 | 6/1955 | Fed. Rep. of Germany | 74/149 |
| 2142827 | 3/1973 | Fed. Rep. of Germany | 74/116 |

OTHER PUBLICATIONS

IBM Technical Disclosure Bulletin, "Selectable Speed . . . ", by Flavin, vol. 4, No. 2, Jul. 1961, pp. 18-19.

*Primary Examiner*—Lawrence Staab
*Attorney, Agent, or Firm*—Robert E. Burns; Emmanuel J. Lobato; Bruce L. Adams

[57] ABSTRACT

The present invention relates to a programmer control device comprising a rotary cam block capable of being driven in rotation step by step by an advancing cam actuating an oscillating pawl carrier.

The control device possesses means of blocking and releasing the action of the pawl, comprising a blocking lever 50' interacting with means capable of rocking the said blocking lever between two angular positions during each to-and-fro movement of the advancing pawl. In the first position, a part 51' of the blocking lever is located in the path of a slope 55 of the pawl 21, so as to prevent the action of the latter. In the second position, the part 51' is not located in the path of the pawl 21, so as to permit the action of the latter. Retention means, such as the nose **79*a* of a release lever 69*a*, which can be actuated, for example, in a delayed manner, are capable of retaining the blocking lever 50' in its second angular position counter to the action of the spring 49, to release the action of the pawl 21** at the end of a certain delay period.

The invention can be used to control, in particular, a clothes washing machine or a dish washing machine.

17 Claims, 5 Drawing Figures

PROGRAMMER CONTROL DEVICE

The present invention relates to programmer control devices comprising a rotary program cam block capable of being driven in rotation step by step by a step-by-step advancing device comprising an oscillating support intended for oscillating at each revolution of an advancing cam. This oscillating support supports at least one advancing pawl capable of interacting, under the action of an elastic means, with a toothed movable body connected kinematically to the program cam block. Means are provided for sometimes blocking and sometimes releasing the action of the advancing pawl on the toothed movable body.

In known programmer control devices of this type, such as that described in French Pat. No. 2,162,073, the means provided for blocking the action of the advancing pawl on the toothed movable body connected kinematically to the program cam block consist of a restoring spring which tends constantly to prevent the pawl engaging with the teeth of the toothed movable body. The means provided, on the contrary, for releasing the action of this advancing pawl consist of an elastic lever intended to be actuated by an electromagnet. When the electromagnet is energized, the lever pushes the pawl forwards against the action of the restoring spring, until this pawl engages with the toothed movable body and can then actuate the latter the amount of one tooth during each of its to-and-fro movements. Such a device has some disadvantages. In fact, it is necessary for the electromagnet to have a sufficient power and therefore a relatively large bulk in order not only to overcome the resistance of the restoring spring, but also to keep the pawl elastically engaged with the teeth of the toothed movable body during each to-and-fro movement of this pawl. The electrical power necessary for actuating such an electromagnet is therefore considerable, and the latter cannot be actuated directly by means of an electronic control circuit of very low power.

The present invention proposes to make it possible to produce a programmer control device, of which the means provided for automatically blocking or releasing the step-by-step advance of the cam block not only can be actuated with only a very slight force being required, whilst at the same time having a sufficiently reduced bulk to be accommodated, if necessary, completely within the program cam block when the latter is hollow, but also are interchangeable and can even be used simultaneously in some cases, and can be made suitable for a single step-by-step advance device, thus making it possible for each to be made suitable for a specific requirement, without the entire structure of the rest of the device being implicated in the change.

The programmer control device according to the invention is defined in that the blocking and release means comprise a blocking lever interacting with means capable of rocking the blocking lever during each to-and-fro movement of the advancing pawl, between two angular positions. In the first angular position, a part of the blocking lever is located in the path of the advancing pawl or of the oscillating support, to block the action of this pawl on the toothed movable body. In the second angular position, the said part of the blocking lever is not located in the path of the advancing pawl or of the oscillating support, so as to release the action of this pawl on the toothed movable body. The blocking and release means also incorporate retention means which can be actuated instantaneously and/or in a delayed manner and which are capable of retaining the blocking lever in its first position or in its second position at a moment when the said lever occupies the said position, a restoring spring constantly tending to return the said lever to its other position.

The programmer control device can be used in cases where the toothed movable body interacting with the advancing pawl consists of a first toothed ring integral with the cam block, on which is mounted rotatably at least one collar displaceable in rotation under the action of another advancing pawl located on the same oscillating support as the first. It is defined in that the retention means, which can be actuated after any one of several predetermined delay periods, comprise an oscillating arm possessing an acutating nose designed to be lifted by each tooth of a toothed ring integral with the first part of the cam block and located next to the first ring, counter to the action of an elastic means. The said oscillating arm supports a movable counting body which pivots and, on the side of this movable body opposite the actuating nose, release levers mounted side by side pivotally on a common axle and identical in number to the predetermined delay periods. The movable counting body constantly tends to be brought angularly up against a fixed stop under the action of an elastic means and possesses on its periphery drive barbs located in the path of at least one drive finger integral with the rotating collar, so that the movable counting body advances the amount of one tooth at each passage of a finger. A first release lever possesses a first non-return nose which interacts successively, under the action of an elastic means, with each of the drive barbs of the movable counting body or with other barbs concentric relative to the preceding ones, one of which is deeper than the others. The other release levers are capable, under the action of elastic means, of interacting respectively either, by means of a first nose, with cams which are arranged against one another and form part of the movable counting body and which each possess a notch of a depth substantially equal to that of the deepest barb, or, by means of the same first nose or by means of another nose, with stops offset relative to one another in the direction of the toothed ring. The notches and the deepest barb are offset angularly relative to one another. The stops consist either of the profile of at least one selection cam integral with the first part of the cam block or of parts of a delay selection lever possessing a nose interacting, under the action of an elastic means, with the said profile of the selection cam, the latter possessing as many levels as there are predetermined delay periods. Each release lever possesses a second retention nose which is capable, when the first corresponding nose interacts with the deepest barb or with the notch of one of the cams, of retaining a part of the blocking lever when the latter, counter to the action of its elastic means, occupies its second angular release position. A fixed stop is located in the path followed by the release levers during the pivoting of the oscillating arm, which supports them under the effect of the rotation by the amount of one tooth of the toothed ring intended for actuating the said arm, in order, on the one hand, to disengage the retention nose from the path of the blocking lever and, on the other hand, to disengage from the movable counting body the first nose of the first release lever and/or any one of the first respective noses of the other release levers.

The attached drawing illustrates by way of example an embodiment of the invention.

Figure 1:
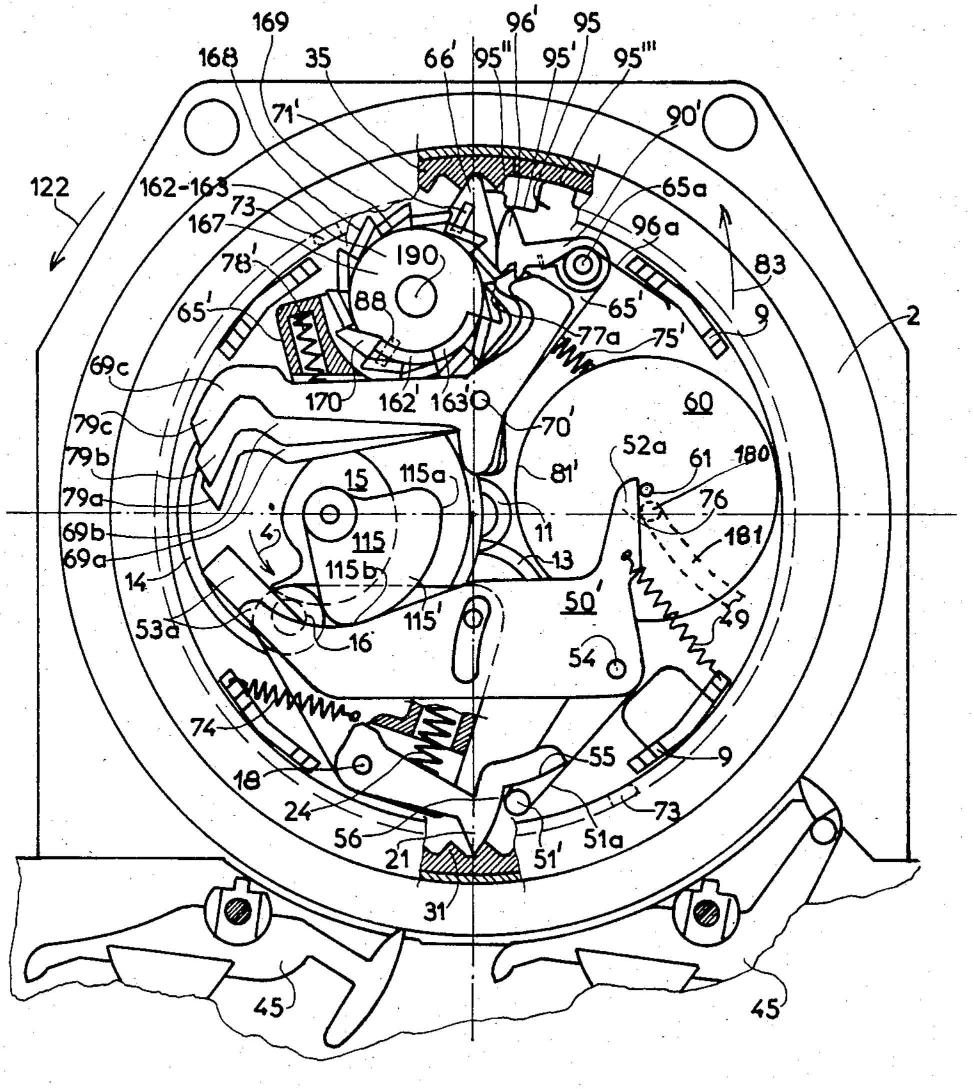
FIG. 1 shows this embodiment seen in a plan view in section along the line I—I of FIG. 2.
Figure 2:
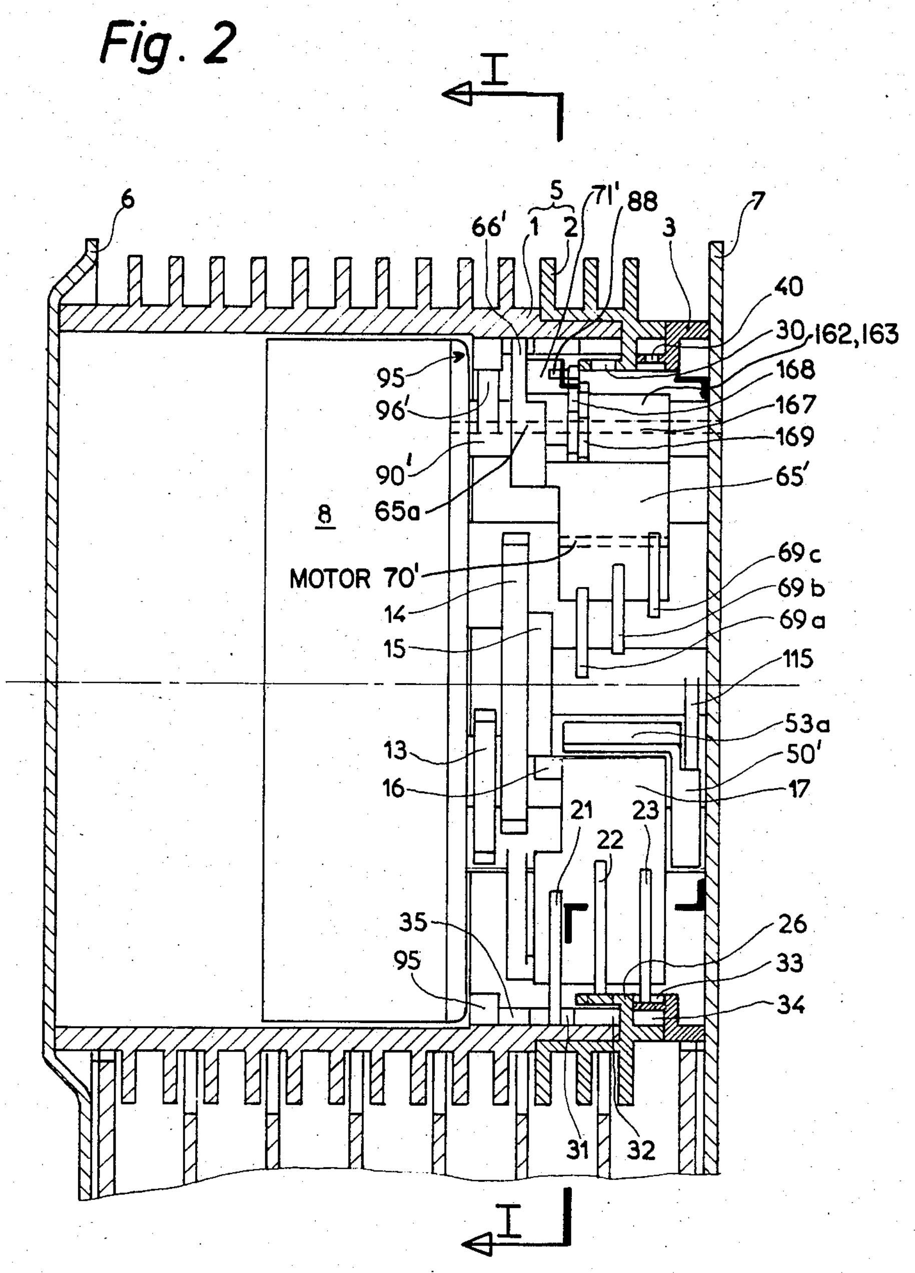
FIG. 2 shows the same embodiment seen from the left of FIG. 1 with the cam block cut away.

As illustrated in FIGS. 1 to 5, the programmer control device according to the invention incorporates a rotary program cam block 5 which, in this example, is hollow and is retained axially and radially between two metal plates 6 and 7. Located on the inside of this rotary cam block 5 is a micro-motor 8 which is fixed to the plate 7 by means of struts 9. This micro-motor 8 carries on its output shaft a toothed pinion 11 which is capable, by means of a movable toothed reducer 13, of driving in rotation a gear wheel 14 integral with an advancing cam 15 which has, for example, a snail-shape profile. Thus, for example, the micro-motor 8 rotates at 750 revolutions per minute and the advancing cam 15 at one revolution per second. Retained constantly up against the profile of the cam 15 by means of a spring 74 is a drive finger 16 forming part of an oscillating support 17 which is oscillatable about an axis 17*a* and which, in this example, supports three advancing pawls 21, 22, 23 arranged next to one another and pivoting about a common shaft 18 fastened to the support 17.

As illustrated in FIGS. 1 to 5, the first advancing pawl 21 constantly tends, under the action of a spring 24, to interact with the barbs of a first toothed ring 31 integral with the inner periphery of a first part 1 of the cam block 5. The second advancing pawl 22 constantly tends, under the action of another spring 24, to interact with the smooth inner periphery of a cylindrical extension 26 provided on a cylindrical collar constituting the second part 2 of the program cam block 5. This second part 2 is mounted rotatably on the first part 1. It supports the profiles of the so-called "rapid" cams. Two orifices 30 diametrically opposite one another pass completely through the extension 26 and are intended to allow the nose of the pawl 22 to pass, so that the latter can then interact with a second toothed ring 32 integral with the first part 1 of the cam block 5. In this example, the second toothed ring 32 consists of an extension of the first toothed ring 31. Some teeth of this toothed ring 32 are omitted. The third advancing pawl 23 interacts constantly, under the action of another compression spring 24, on the one hand with a third toothed ring 33 integral with the inner periphery of a rate reduction collar 3 mounted rotatably within the second part 2 of the cam block 5, and, on the other hand, via orifices 40 passing completely through this rotary collar 3, with a fourth toothed ring 34 integral with the second part 2. In fact, the reduction collar 3 bears on the tips of the teeth of the fourth toothed ring 34, and in this example it possesses 15 orifices 40 distributed over its periphery. The fourth toothed ring 34 is thus located immediately behind the 15 orifices 40. The four toothed rings each possess 60 teeth. The profiles of the cams supported by the first and second parts 1 and 2 of the cam block 5 interact with rocker levers 45 which themselves actuate switches not shown in the drawing.

Figure 3:
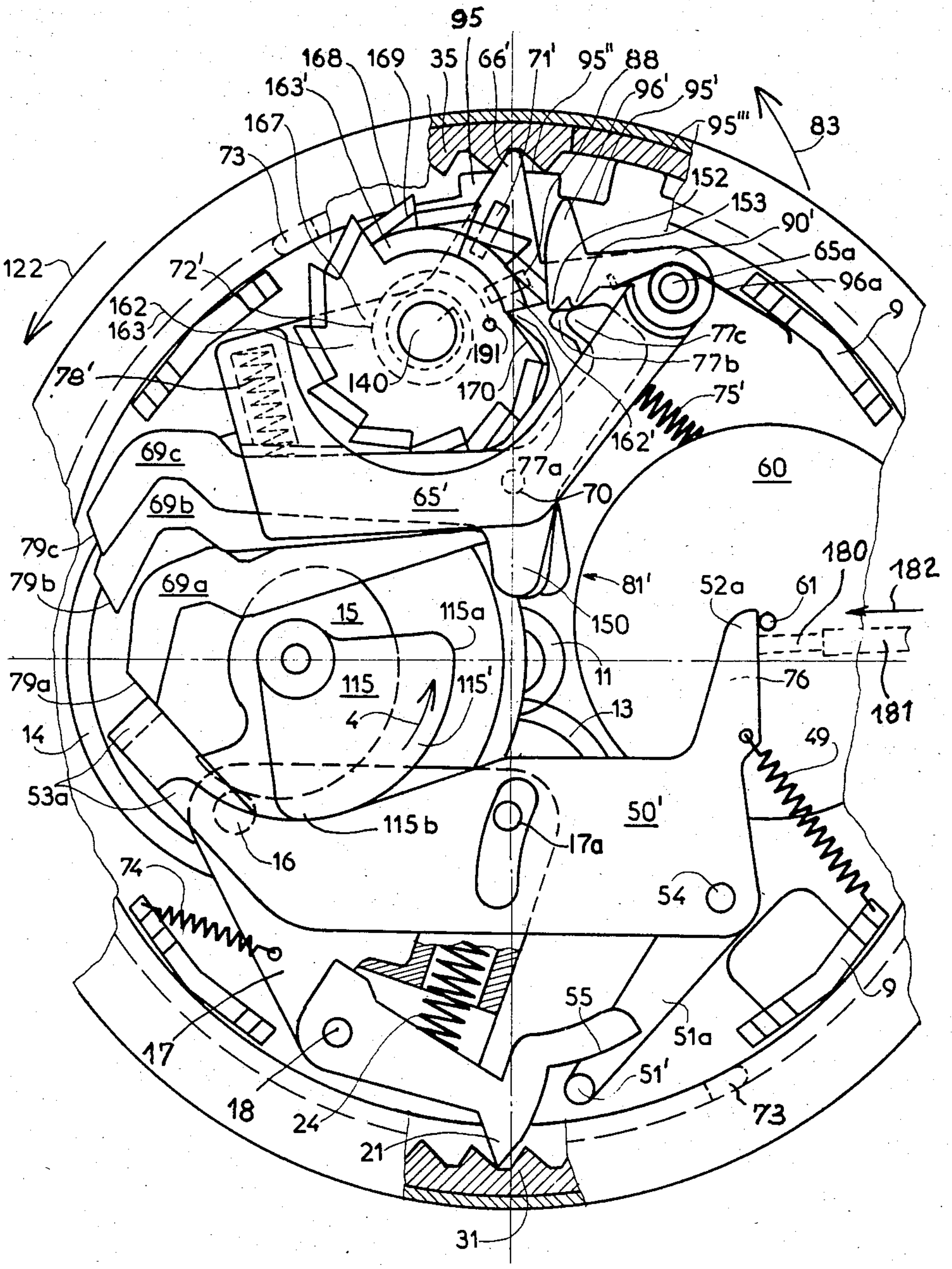
FIG. 3 shows, on a larger scale, part of FIG. 1 at the moment when a delay period ends.
Figure 4:
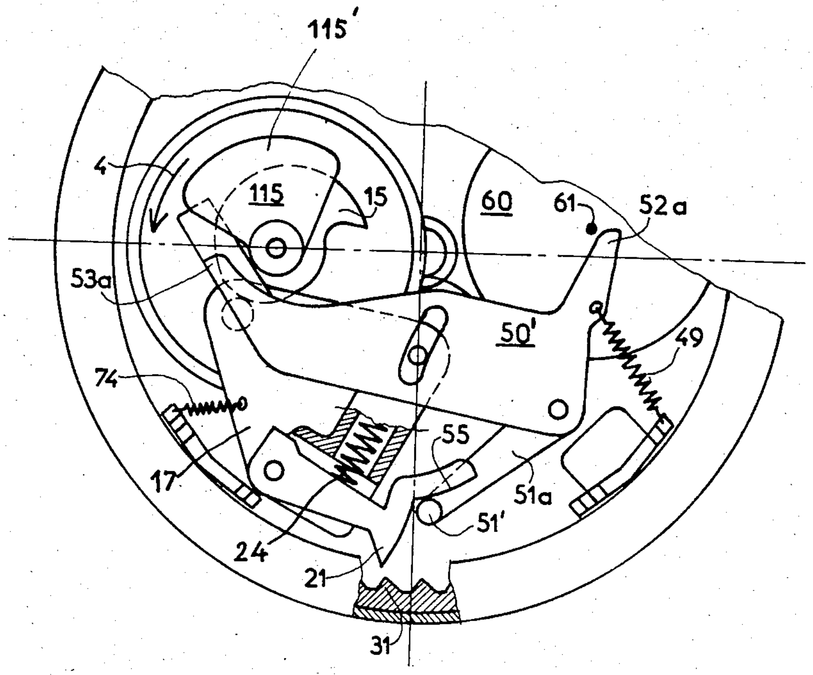
FIGS. 4 and 5 show the same embodiment in two different operating phases.
Figure 5:
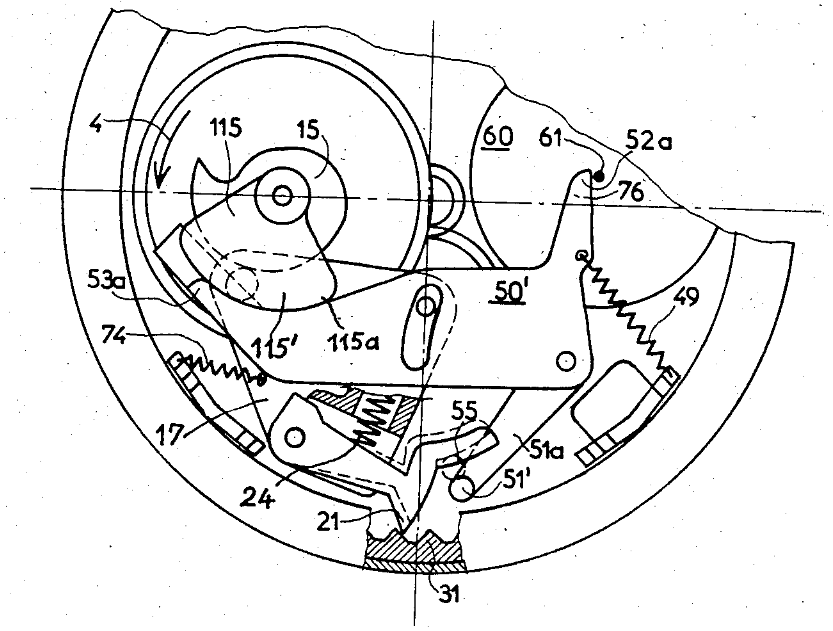

The control device incorporates a blocking lever 50′ which is mounted pivotally about the axle 54. The lever 50′ possesses three arms 51*a*, 52*a*, 53*a*. The first arm 51*a* has a finger 51′ intended to interact with the slope 55 forming part of the first pawl 21, so as to move the said pawl 21 away from the teeth of the toothed ring 31 when the blocking lever 50′ occupies its first angular blocking position (FIG. 4) under the action of its tension spring 49. In this embodiment, the slope 56 (FIG. 1) of the advancing pawl 21 has no part to play and is therefore not intended to come up against the finger 51′ in order, at the end of the advance of the pawl 21, to bring the blocking lever 50′ into its second angular release position (FIGS. 1, 3 and 5). The means capable of rocking the blocking lever (50′) in this way between its first and second angular position counter to the action of its spring 49, during each to-and-fro movement of the advancing pawl 21, consist of a rotary cam 115, called a "release" cam, intended for interacting with a part of the blocking lever 50′ consisting of the third arm 53*a* of this lever. This release cam 115 is integral with the advancing cam 15 and therefore rotates at the same speed as the latter in the direction the arrow 4. It has a high level 115′ wedged sloping angularly so that its front part 115*a* pushes back the third arm 53*a* of the blocking lever 50′, so as to bring the latter into its second release position, as soon as the first advancing pawl 21 has executed a sufficient advance to have gone beyond the point where it can possibly catch on the following tooth of the toothed ring 31. The rear part 115*b* of the high level 115′ is designed to move away from the third arm 53*a* when the first pawl 21 has executed its entire advance.

In the present embodiment there are two types of retention means capable of being actuated simultaneously.

First retention means consist of a part of the movable armature of an electromagnet 60. This is, for example, the end part 61 of a plunger core. The path of this part 61 is such that the latter is capable of intersecting the path of the second arm 52*a* of the blocking lever 50′, when the latter, counter to the action of its spring 49, occupies its second angular release position, so as to retain it in this second position, as shown in FIG. 5. The part 61 is likewise capable of coming up against a part of the second arm 52*a*, in this example against the lower face 76 of the latter, in a waiting position, when the blocking lever 50′ occupies its first angular position or during the time when it rocks between its two angular positions.

Without departing from the scope of the present invention, the first retention means which can be actuated instantaneously can consist of a part 180 of a mechanical control element, for example displaceable manually, formed, for example, by a first end of a flexible sliding element 181, represented by broken lines in FIG. 1, of which the second end opposite the first can be actuated by means of a push button not shown in the drawing. The part 180 follows such a path that it is capable of interacting with the blocking lever 50′ by intersecting the path of this lever when the latter, counter to the action of its spring 49, occupies its second angular release position, so as to retain it in this second position. Another solution would be to arrange the manually displaceable mechanical control element 181 in the way shown by broken lines in FIG. 3, so that its part 180 follows such a path that it can, if required, push back the blocking lever 50′ in the direction 182 and maintain it in its second angular release position, counter to the action of its elastic means spring 49.

Without departing from the scope of the present invention, the mechanical control element 181, which consists of a flexible sliding element or not, could be actuated not manually, but in particular by means of temperature, level or pressure sensors and/or by means of one or more cams connected angularly to the cam block.

The second retention means can be actuated after any one of several predetermined delay periods. They comprise an oscillating arm 65' shown in its entirety in FIG. 3 only. This arm 65' pivoting about a shaft 65a possesses an actuating nose 66' intended to be lifted counter to the action of a spring 75' by each tooth of a fifth toothed ring 35. This ring 35 is integral with part 1 of the cam block 5 and consists of an extension of the first toothed ring 31. The oscillating arm 65' supports a movable counting body 167 mounted pivotally on the arm 65' with a pivot shaft 180 and, on the side of this movable body opposite the actuating nose 66', release levers, three in this example, 69a, 69b and 69c, mounted side by side pivotally on oscillating arm 65' with a common axle 70' (FIG. 1) and identical in number to the predetermined delay periods.

The movable counting body 167 constantly tends to be displaced angularly in the opposite directlon to the arrow 83, so as to bring its finger 88 up against a stop 71' under the action of a helicoidal spring means 72' having one end fixed to the pivot shaft 190 and the other end anchored in a hole 191 in the body 167 (FIG. 3). It possesses on its periphery drive barbs 168 arranged in the path of at least one drive finger 73, two in this example. These fingers 73 are integral with the rotating collar 2 of the cam block 5, so that the movable counting body 167 advances the amount of one tooth in the direction 122 at each passage of a finger 73.

As shown in particular in FIG. 3, the first release lever 69a possesses a first non-return nose 77a which interacts in succession, under the action of a spring 78' (FIG. 1), with other barbs 169 concentric relative to the preceding ones 168, one 170 of which is deeper than the others. Without departing from the scope of the present invention, the first non-return nose 77a could interact not with the teeth 169, but with the drive barbs 168 which, in this case, would have one tooth 170 which is deeper than the others.

The other release levers 69b, 69c possess respectively first noses 77b, 77c capable of interacting respectively, under the action of springs 78', either with stops 152, 153 offset relative to one another in the direction of the toothed ring 31 or with cams 162, 163 laid against one another and forming part of the movable counting body 167. In this example, the stops 152, 153 are integral with a delay selection lever 90' which is, for example, pivotally mounted coaxially relative to the oscillating arm 65'. The cams 162, 163 each possess on their periphery a notch 162' and 163' respectively, of a depth which is substantially equal to that of the deepest barb 170. These notches 162', 163' and the deepest barb 170 are offset angularly relative to one another.

The delay selection lever 90' possesses a nose 96' which constantly interacts, under the action of a spiral spring 96a, with a selection cam 95 (FIGS. 1 to 3) integral with the inner periphery of the first part 1 of the cam block 5. In this example, this cam 95 has three levels, that is to say as many as there are predetermined delay periods: a high level 95', a medium level 95'' and a low level 95'''.

Each release lever 69a, 69b, 69c possesses a second retention nose 79a, 79b, 79c respectively, which, when the first corresponding nose 77a, 77b, 77c interacts with the deepest barb 170 or with the notch 162', 163' of one of the cams 162, 163, is capable of retaining the third arm 53a of the blocking lever 50' at a moment when the latter, counter to the action of its spring 49, occupies its second angular release position.

A fixed stop 81' is located on the plate 7. It is arranged in the path followed by a projecting part 150 provided on each of the release levers 69a, 69b, 69c, during the pivoting of the oscillating arm 65' supporting them under the effect of the rotation of the toothed ring 35, intended for actuating the said arm, in the direction of the arrow 122 the amount of one tooth. In this example, the stop 81' consists of the flank of the electromagnet 60.

When the micro-motor 8 (FIG. 2) is supplied with current, the advancing cam 15 and the release cam 115 execute 60 revolutions per minute in the direction of the arrow 4, and the oscillating support 17 and the three advancing pawls 21, 22, 23 oscillate 60 times per minute between a rear position and a forward position.

Three successive phases in the operation of the first advancing pawl 21 can be considered. During the first phase, the advancing pawl 21 leaves its rear position (FIG. 4) in which its slope 55 is up against the finger 51' of the blocking lever 50'. Since the latter occupies its first blocking position under the action of its spring 49 (FIG. 4), the pawl 21 is lifted out of the teeth of the toothed ring 31. It thus remains lifted during its entire displacement phase which ends when it occupies the position shown by broken lines in FIG. 5, that is to say when it has executed a sufficient advance to have gone beyond the point where it can possibly catch on the following tooth of the toothed ring 31.

At this moment, at the start of the second phase, as shown in FIG. 5, the front part 115a of the high level 115' of the release cam 115 comes in contact with the third arm 53a and rocks the blocking lever 50' into its second release position. The finger 51' releases the first pawl 21 which falls onto the front flank of a tooth of the ring 31 (FIG. 5) and subsequently slides to the base of the same tooth, to occupy its forward position shown in FIG. 1, without driving the ring 31 in rotation.

The third phase of operation of the pawl 21 begins at this moment, when the advancing cam 15 abruptly moves away from the oscillating support 17 and when the rear part 115b of the high level of the release cam 115 moves away from the third arm 53a of the blocking lever 50' which consequently resumes its first blocking position. The pawl 21 is then located in its rear position again (FIG. 4), at the start of phase 1, being lifted by the finger 51'.

To arrive at this rear position, the pawl 21 is capable of following two paths in particular. In the event that the oscillating support 17 is released before the blocking lever 50', the nose of the pawl 21 moves back, brushing against the tooth of the ring 31, and drops again behind this tooth, the slope 55 coming up against the finger 51' and remaining there when the blocking lever 50' is released in turn in its first blocking position. In another case where the blocking lever 50' is released before the oscillating support 17, the nose of the pawl 21 is lifted immediately under the action of the finger 51', and consequently it does not brush against the tooth of the ring 31 during its third operating phase, its slope 55 instead brushing against the finger 51'.

During this time, the second pawl 22 remains up against the smooth periphery of the extension 26. The third pawl 23, during each of its oscillations, drives by the amount of one tooth in the direction of the arrow 122 the third toothed ring 33 of the reduction collar 3 which thus executes one revolution in one minute. Because of the 15 orifices 40 every four teeth the third pawl 23 drives via these orifices 40, by the amount of one tooth each time, the fourth toothed ring 34 of the second part 2 which thus executes one revolution in four minutes. During each revolution of this second part 2, the second pawl 22 drops successively into each of the two orifices 30 in smooth extension 26 and each time drives the amount of one tooth the second toothed ring 32 of the first part 1 of the cam block 5 which thus advances one step every two minutes.

At each half-revolution of the collar 2 every two minutes, a drive finger 73 drives the movable counting body 167 in rotation by the amount of one tooth 168 in the direction of the arrow 83, and the latter thus leaves its initial position counter to the action of its spring 72'. After this advance, the movable counting body 167 is retained angularly by the first non-return nose **77*a* of the first release lever 69*a*. The movable counting body 167 thus counts the half revolutions of the collar 2. During the following advance of the first part 1 of the cam block 5 one step in the direction 122, the fifth toothed ring 35 lifts the nose 66' of the oscillating arm 65' counter to the action of the spring 75'. The projecting part 150 of the first release lever 69*a* then comes up against the fixed stop 81', thus causing the lever 69*a* to pivot in the opposite direction to the arrow 83. The first non-return nose 77*a* is thus disengaged from the barbs 168, thus freeing the movable counting body 167 which returns to its initial position under the action of its spring 72'**.

When the location of an omitted tooth of the second toothed ring 32 comes opposite the second pawl 22, the latter, at the moment when one of the two orifices 30 appears in front of it, cannot drive by the amount of one tooth the second toothed ring 32 and the first part 1 of the cam block 5 which remains stationary. The same is true whenever an orifice 30 appears again in front of the second pawl 22. During this time, at each passage of one of the fingers 73 every two minutes, the movable counting body 167 is driven by the amount of one tooth and each time it is retained in its new angular position by the first non-return nose **77*a***.

The second nose **79*a* of the release lever 69*a* and the second noses 79*b* and 79*c* of the other release levers occupy at the same time a position in which they are not in the path of the third arm 53*a* of the blocking lever 50'. The latter therefore continues to pass through its first and second angular positions at each revolution of the release cam 115**.

At the end of the delay period, one of the first noses **77*a*, 77*b*, 77*c* of the respective release levers finally drops respectively into the deepest tooth 170, the notch 162' or the notch 163'. The choice of nose depends on the position of the stops 152 and 153, that is to say the position of the nose 96' of the delay selection lever 90' on one of the levels 95', 95" or 95''' of the selection cam 95**.

If, for example, the nose 96' is up against the high level 95' of the selection cam 95, as shown in FIGS. 1 and 3, the first noses **77*b* and 77*c* are kept apart from the movable counting body 167 by the stops 152 and 153 respectively. These first noses therefore cannot drop into the notches 162' and 163' when these come opposite them. Only the first nose 77*a*, which also serves as a non-return means, is free to drop into the deepest tooth 170 when the latter comes opposite it, and this corresponds to the end of the longest delay period. At the same time, the corresponding second nose 79*a* comes into the path of the third arm 53*a* of the blocking lever 50' during the time when the latter is retained in its second release position by the release cam 115 (FIG. 3). As soon as the pawl 21 reaches its forward position, the release cam 115 moves away from the third arm 53*a* which is then retained in the same second position by the second nose 79*a***.

The pawl 21 then returns to its rear position and subsequently oscillates again towards its forward position, driving the following tooth, during which time the release cam 115 again retains the blocking lever 50' in its second release position. The displacement of the pawl 21 towards its forward position causes not only the toothed ring 31, but also the toothed ring 35 integral with it to be driven in rotation by the amount of one tooth. The oscillating arm 65' is therefore lifted by means of its nose 66', the projecting part 150 of the release lever **69*a* comes up against the fixed stop 81', and the release lever 69*a* rocks in the opposite direction to 83, its second nose 79*a* moving away from the third arm 53*a* of the blocking lever 50' which remains retained in its release position by means of the release cam 115. At the same time, the first non-return nose 77*a* of the first release lever 69*a* is disengaged from the deepest barb 170, and the movable counting body 167 can rotate in the opposite direction to 83, to return to its initial position up against the fixed stop 71', under the action of its spring 72'**.

In a similar way, if the nose 96' is up against not the high level 95', but the medium level 95" of the selection cam 95, the first nose **77*b* of the release lever 69*b* is freed by the stop 152, and it can drop into the notch 162' when the latter comes opposite it, before the deepest barb 170. In this case, it is the second nose 79*b* which retains the blocking lever 50'** in its release position, to allow the end of the medium delay period.

Likewise, if the nose 96' is up against the low level 95''' of the selection cam 95, it is the first nose **77*c* of the release lever 69*c* which is likewise freed by the stop 153 and which can drop into the notch 163' when the latter comes opposite it before the other notch 162'. In this case, it is the second nose 79*c* of release lever 69*c* which retains the blocking lever 50'** in its release position, to allow the end of the shortest delay period.

In all cases, as soon as the pawl 21 arrives at the forward position (FIG. 1), the rear part **115*b* of the high level 115' of the release cam 115 abruptly moves away from the third arm 53*a* of the blocking lever 50' which returns to its first blocking position under the action of its spring 49**.

Since the second toothed ring 32 has rotated by the amount of one tooth in the direction of the arrow 122 at the same time as the first toothed ring 31, the location of the omitted tooth of this ring 32 is no longer opposite the second pawl 22 which is now free to advance the first part 1 of the cam block 5 one step every two minutes at the normal rate.

The embodiment described above has an additional advantage in the event that the cam block 5 has been actuated manually in terms of rotation and has been stopped unintentionally in an intermediate angular position not corresponding exactly to that obtained automatically as a result of a complete oscillation of the advancing pawl 21. In this case, during its first following oscillation in a forward direction, in its second operating phase during which it is released so that it comes to bear against the flank of a tooth of the toothed ring 31, the pawl 21 drives this tooth in order to complete the advance by one step which was begun.

Another advantage of this control device is that, if the cam block 5 is actuated in rotation manually at a moment when a drive finger 73 is in the immediate vicinity of the barbs 168, for example on the point of driving one of them in rotation, this finger 73 does not prevent the movable counting body 167 from returning instantaneously to its original position, since at this moment the latter is apart from this finger under the effect of the rocking of the oscillating arm 65' supporting it.

The release cam 115 could be omitted, in which case the rocking of the blocking lever 50' between its first blocking position and its second release position is obtained as a result of the buttressing of the stop 56 of the pawl 21 against the finger 51.

I claim:

1. A programmer control device comprising:
   - a rotary program cam block capable of being driven in rotation by a step-by-step advancing device comprising an oscillating support for oscillating at each revolution of an advancing cam, said oscillating support supporting at a first advancing pawl capable of interacting, under the action of an elastic means, with a toothed movable body connected kinematically to said program cam block,
   - means for alternatively blocking and releasing the action of said advancing pawl on said toothed movable body, said blocking and release means comprising a blocking lever interacting with means for rocking the said blocking lever, during each to-and-fro movement of the advancing pawl, between two angular positions, namely a first angular position in which a part of the blocking lever is located in the path of said advancing of the blocking lever is located in the path of said advancing pawl to block the action of said pawl on the toothed movable body and a second angular position in which the said part of said blocking lever is not located in the path of the advancing pawl so as to release the action of said pawl on the toothed movable body,
   - and further comprising retention means actuatable to retain the blocking lever in a selected one of said positions at a moment when the said lever occupies the respective position and a restoring spring constantly tending to return the said lever to the other of said positions,
   - said toothed movable body interacting with said advancing pawl comprising a toothed ring integral with said cam block, on which is mounted rotatably at least one collar displaceable in rotation under the action of a second advancing pawl located on the same oscillating support as said first advancing pawl.

2. A programmer control device as claimed in claim 1, wherein the means for rocking the blocking lever (50') between its first and its second angular positions counter to the action of said restoring spring, during each to-and-fro movements of said first advancing pawl (21), consist of a rotary cam (115) intended for interacting with a part **(53*a*) of the blocking lever (50'), so as to actuate the latter as soon as the advancing pawl (21) has executed a sufficient advance to go beyond the point where it can possible catch on the following tooth to the toothed ring (31)**.

3. A programmer control device as claimed in claim 1, wherein the retention means consist of a part (180) of a mechanical control element (181) which is displaceable instantaneously and the path of which is such that the said part (180) is capable of interacting with the blocking lever (50') either by intersecting the path of this lever when the latter occupies its second angular release position, counter to the action of said restoring spring or by pushing back the said lever (50') and retaining it in this second angular position.

4. A programmer control device as claimed in claim 1, wherein the said retention means actuatable after any one of several predetermined delay periods comprise an oscillating arm (65') possessing an actuating nose (66') designed to be lifted by each tooth of a second toothed ring (35) integral with a first part of said cam block and located next to said first toothed ring (31), counter to the action of an elastic means (75'), the said oscillating arm supporting a movable counting body (167) which pivots and, on the side of said movable body opposite the actuating nose (66'), release levers **(69*a*, 69*b*, 69*c*) mounted side by side pivotally on a common axle (70') and identical in number to predetermined delay periods, said movable counting body (167) constantly tending to be brought angularly up against a fixed stop (71') under the action of an elastic means (72') and possessing on its periphery drive barbs (168) located in the path of at least one drive finger (73) integral with the rotating collar (32), so that the movable counting body (167) advances the amount of one tooth at each passage of a finger (73), a first release lever (69*a*) possessing a first non-return nose (77*a*) which interacts successively, under the action of an elastic means (78'), with each of the drive barbs (168) of the movable counting body (167) or with other barbs (169) concentric relative to the preceding ones, one (170) of which is deeper than the others, the other release levers (69*b*, 69*c*) being capable, under the action of elastic means, of interacting respectively either, by means of a first nose (77*b*, 77*c*), with cams (162, 163) which are arranged against one another and form part of the movable counting body (167) and which each possess a notch (162, 163') of a depth substantially equal to that of the deepest barb (170), or, by means of the same first nose or by means of another nose, with stops (152, 153) offset relative to one another in the direction of the toothed ring (31), the notches and the deepest barb being offset angularly relative to one another, (95', 95'', 95''') as there, each release lever (69*a*, 69*b*, 69*c*) possessing a second retention nose (79*a*, 79*b*, 79*c* respectively) which, when the first corresponding nose (77*a*, 77*b*, 77*c*) interacts with the deepest barb (170) or with the notch (162', 163') of one of the cams (162, 163), is capable of retaining a part (53*a*) of the blocking lever (50') when the latter, counter to the action of its elastic means (49), occupies its second angular release position, a fixed stop (81') being located in the path followed by the release levers (69*a*, 69*b*, 69*c*), during the pivoting of the oscillating arm (65') supporting them under the effect of the rotation by the amount of one tooth of the secong toothed ring (35), intended for actuating the said arm, in order, on the one hand, to disengage the retention nose (79*a*, 79*b*, 79*c*) from the path of the release lever (50') and, on the other hand, to disengage from the movable counting body (167) the first nose (77*a*) of the first release lever (69*a*)** and/or any one of the first respective noses (77*b*, 77*c*) of the other release levers (69*b*, 69*c*).

5. A programmer control device according to claim 4, in which said offset stops comprise the profile of at least one selection cam integral with said cam block.

6. A programmer control device according to claim 4, in which said offset stops comprises a profiled selection cam and a selection lever having a nose interacting, under the action of an elastic means, with the profile of said selection cam, said selection cam having as many levels as there are predetermined delay periods.

7. A programmer control device comprising a rotary cylindrical program cam block comprising a first part and a coaxial second part rotatable relative to one another, a micro-motor inside said cam block, an oxcillatable support driven by said micro-motor, first, second and third pawls pivotally mounted on said support, said first pawl resiliently engaging a first toothed ring and said first cam block part, said second pawl resiliently engaging the smooth inner periphery of an inner cylindrical extension of said second cam block part which is disposed inside said first cam block part and has at least one aperture through which said second pawl extends to engage a second toothed ring integral with said first cam block part, said third pawl resiliently engaging a third toothed ring integral with a rate reducing collar coaxially rotatable relative to said cam block, said third toothed ring having a plurality of circumferentially spaced apertures through which said third pawl is engageable with a fourth toothed ring integral with said second cam block part, a pivoted blocking lever and means for selectively positioning said blocking lever in a blocking position in which it interacts with said first pawl to prevent said first pawl from engaging said first toothed ring and a release position in which it permits engagement of said first pawl with said first toothed ring.

8. A program control device according to claim 7, in which said second toothed ring is an extension of said first toothed ring and has some teeth omitted.

9. A program control device according to claim 8, further comprising means for oscillating said blocking lever between said blocking position and said release position and means for selectively retaining said blocking lever in the release position.

10. A program control device according to claim 9, in which said retention means comprises an electromagnetically controlled abutment engageable by said blocking lever.

11. A program control device according to claim 9, in which said retention means comprises at lease one release lever and means for selectively moving said release lever between a position in which said release lever engages said blocking lever to retain it in the release position and a position in which said release lever does not so engage said blocking lever.

12. A program control device according to claim 11, in which said retention means comprises a plurality of said release levers for different release periods.

13. A program control device according to claim 11, in which said retention means further comprises means for counting rotations of a part of said cam block and actuating said release lever upon predetermined number of rotations of said cam block part.

14. A program control device according to claim 13, in which said counting means comprises a rotatable counting body, means on said cam block part for rotating said counting body step-by-step as said cam block part rotates and a cam contour on said counting body for actuating said release lever.

15. A program control device according to claim 11, in which said retention means further includes a delay selection lever cooperating with said release lever and means on said cam block for actuating said delay selection lever as said cam block rotates.

16. A program control device according to claim 7, in which said blocking lever has three arms, namely a first arm which interacts with said first pawl, a second arm engageable by a first retention means for retaining said blocking lever in the release position and a third arm engageable by a second retention means for retaining said blocking lever in the release position.

17. A program control device according to claim 11, in which said first retention means comprises an abutment selectively movable between a position in which it is engageable by said second arm of said blocking lever to retain said blocking lever in the release position and a position in which it is not engageable by said second arm of said blocking lever.

* * * * *